United States Patent
Chan et al.

(10) Patent No.: US 10,044,811 B2
(45) Date of Patent: Aug. 7, 2018

(54) METHODS AND SYSTEMS FOR FORWARDING DATA

(71) Applicant: Pismo Labs Technology Limited, Hong Kong (HK)

(72) Inventors: Ho Ming Chan, Hong Kong (HK); Ying Kwan, Hong Kong (HK); Chak Ming Lau, Hong Kong (HK); Ki Tak Cheuk, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 195 days.

(21) Appl. No.: 14/410,094

(22) PCT Filed: Mar. 5, 2014

(86) PCT No.: PCT/IB2014/059452
§ 371 (c)(1),
(2) Date: Dec. 21, 2014

(87) PCT Pub. No.: WO2015/132630
PCT Pub. Date: Sep. 11, 2015

(65) Prior Publication Data
US 2016/0285976 A1    Sep. 29, 2016

(51) Int. Cl.
*G06F 15/173* (2006.01)
*H04L 29/08* (2006.01)
(Continued)

(52) U.S. Cl.
CPC ........ *H04L 67/142* (2013.01); *H04L 61/2007* (2013.01); *H04L 67/02* (2013.01); *H04W 4/50* (2018.02); *H04W 12/02* (2013.01)

(58) Field of Classification Search
CPC ..... H04L 67/142; H04L 67/02; H04L 61/007; H04W 12/02; H04W 4/001
See application file for complete search history.

(56) References Cited

U.S. PATENT DOCUMENTS

| | | | | |
|---|---|---|---|---|
| 2009/0138577 A1* | 5/2009 | Casado | ................... | H04L 41/06 709/220 |
| 2014/0280809 A1* | 9/2014 | Li | ...................... | H04L 41/0806 709/222 |
| 2016/0142914 A1* | 5/2016 | He | ......................... | H04L 67/34 726/12 |

FOREIGN PATENT DOCUMENTS

| CN | 101051932 A | 10/2007 |
|---|---|---|
| CN | 102316479 A | 1/2012 |
| CN | 102790693 A | 11/2012 |

OTHER PUBLICATIONS

International Search Report in International Application No. PCT/IB2014/059452, dated Dec. 1, 2014.
(Continued)

*Primary Examiner* — Richard G Keehn
(74) *Attorney, Agent, or Firm* — Hershovitz & Associates, PLLC; Abe Hershkovitz

(57) ABSTRACT

Methods and systems for forwarding data between a first network element and a terminal at a management server, comprising the steps of receiving a request from the terminal to communicate with the first network element during a first data session; determining whether a first connection has been established with the first network element; establishing the first connection with the first network element if the first connection has not been established with the first network element; and forwarding data between the first network element and the terminal using the first connection during the first data session.

30 Claims, 10 Drawing Sheets

(51) Int. Cl.
    *H04W 12/02*     (2009.01)
    *H04L 29/12*     (2006.01)
    *H04W 4/50*     (2018.01)

(56) References Cited

OTHER PUBLICATIONS

Written opinion of the International Searching Authority in International Application No. PCT/IB2014/059452, dated Dec. 1, 2014.

* cited by examiner

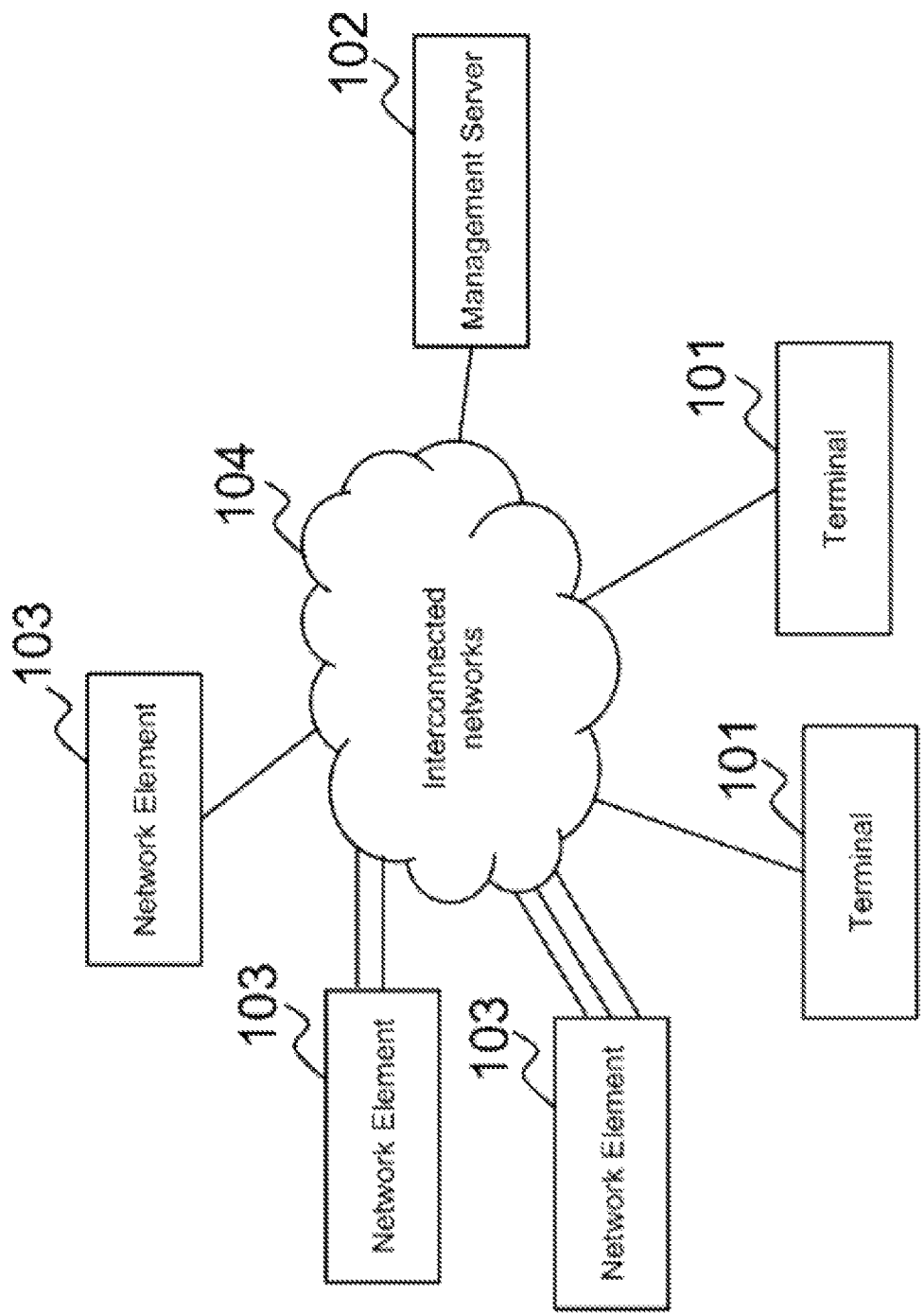
[Fig. 1]

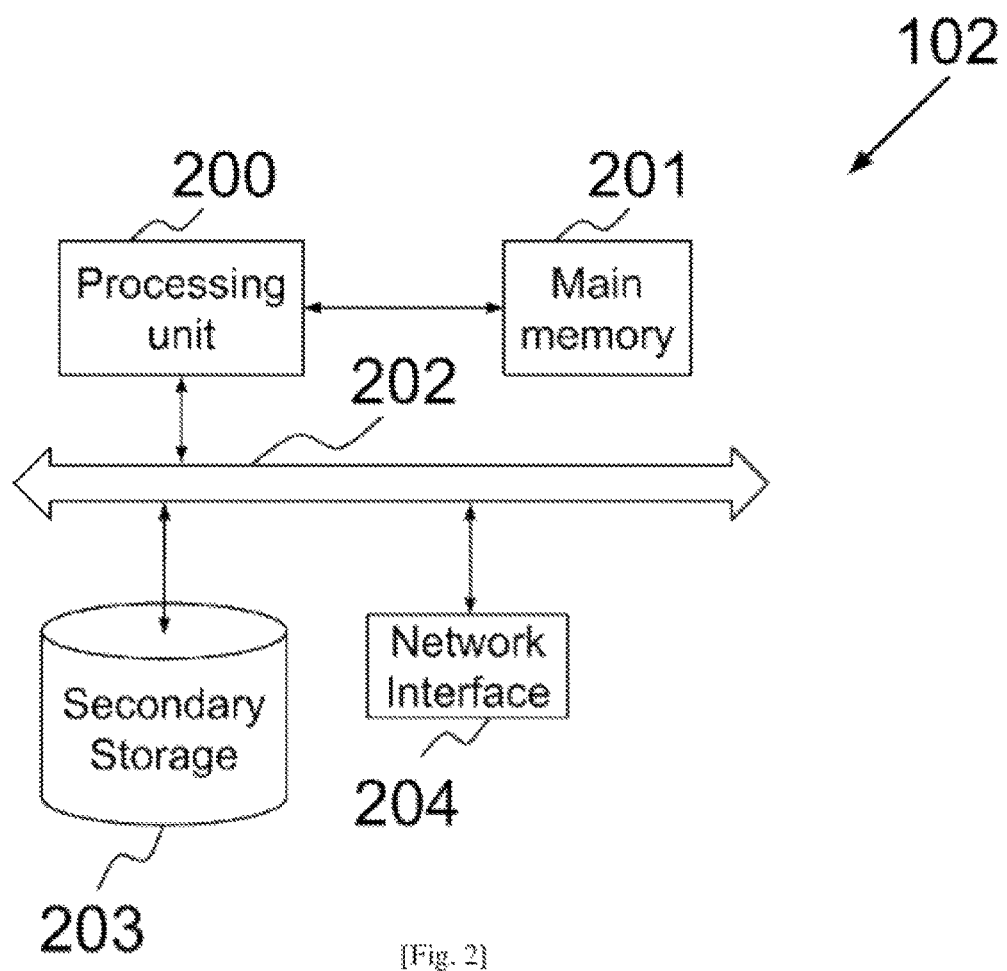
[Fig. 2]

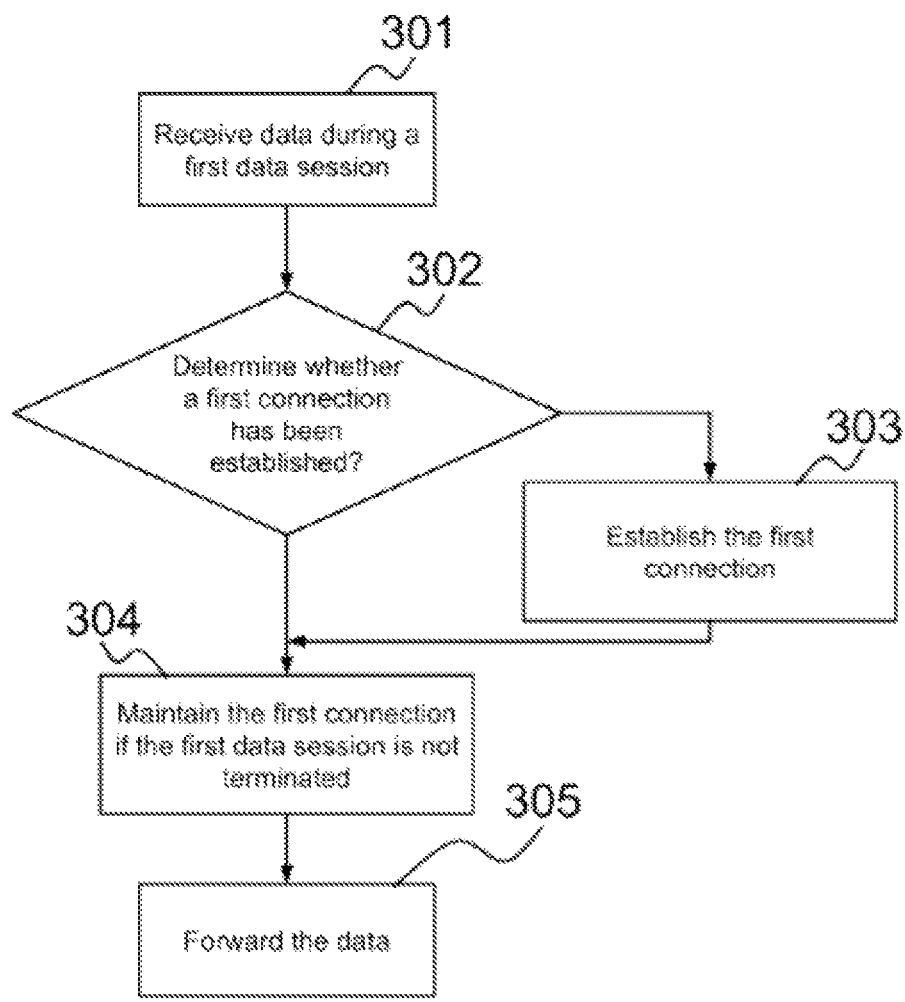
[Fig. 3]

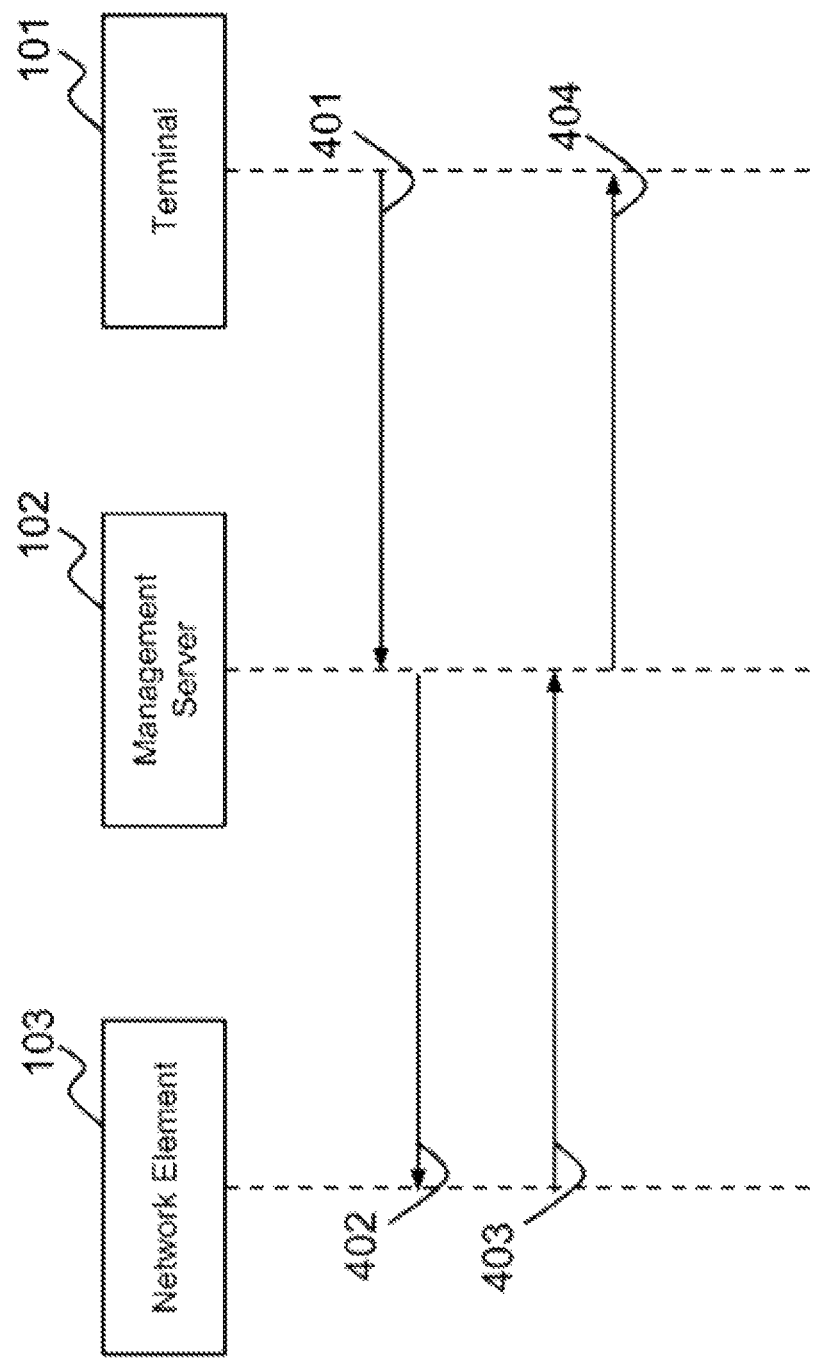

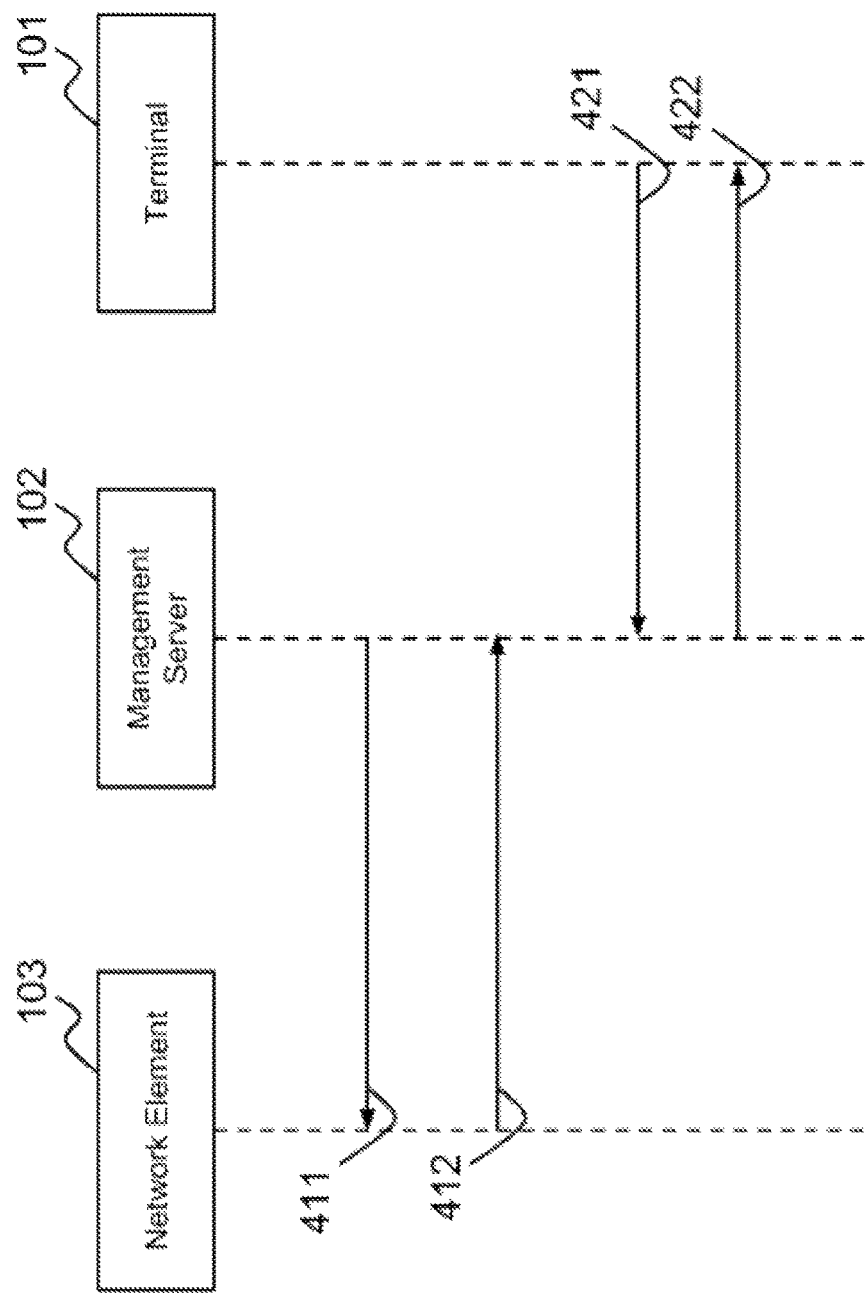
[Fig. 4B]

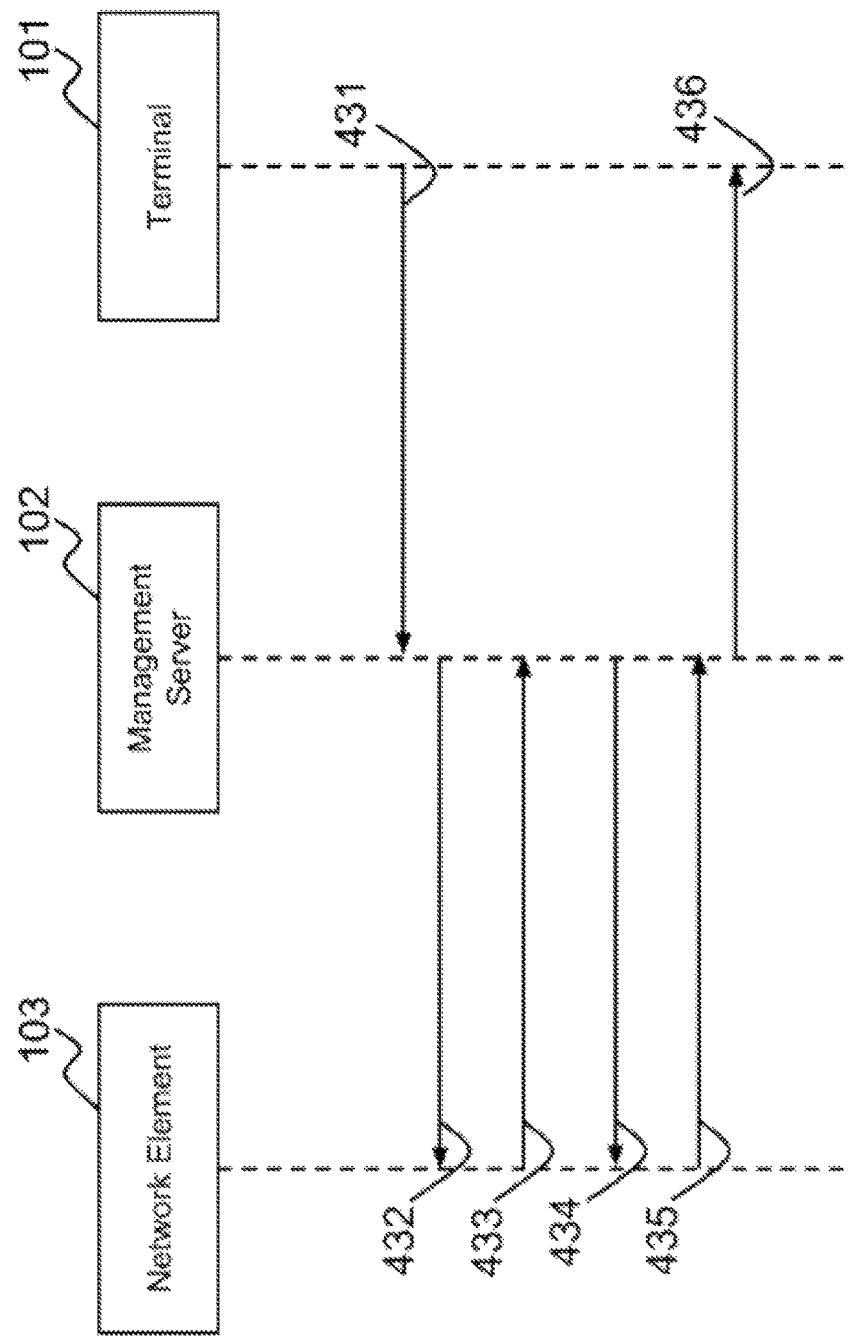
[Fig. 4C]

501

| | |
|---|---|
| Information | Edit |
| Device Name | Device A |
| Serial Number | 1234-1234-1234 |
| LAN MAC Address | 00:1A:DD:00:00:00 |
| Product Name | Pepwave MAX BR1 |
| Product Code | MAX-BR1-LTE-E |
| Uptime | an hour |
| First Appeared | 8 days ago (Dec 31 13:05) |
| Band | 2.4 GHz (802.11n/g) |
| Supported No. of SSIDs | 3 |
| Last Config Updated | Jan 07 19:39 |
| SSIDs | Unconfigured SSID, Unconfigured SSID |
| History | Event Log |
| Web Admin Access | Visit |

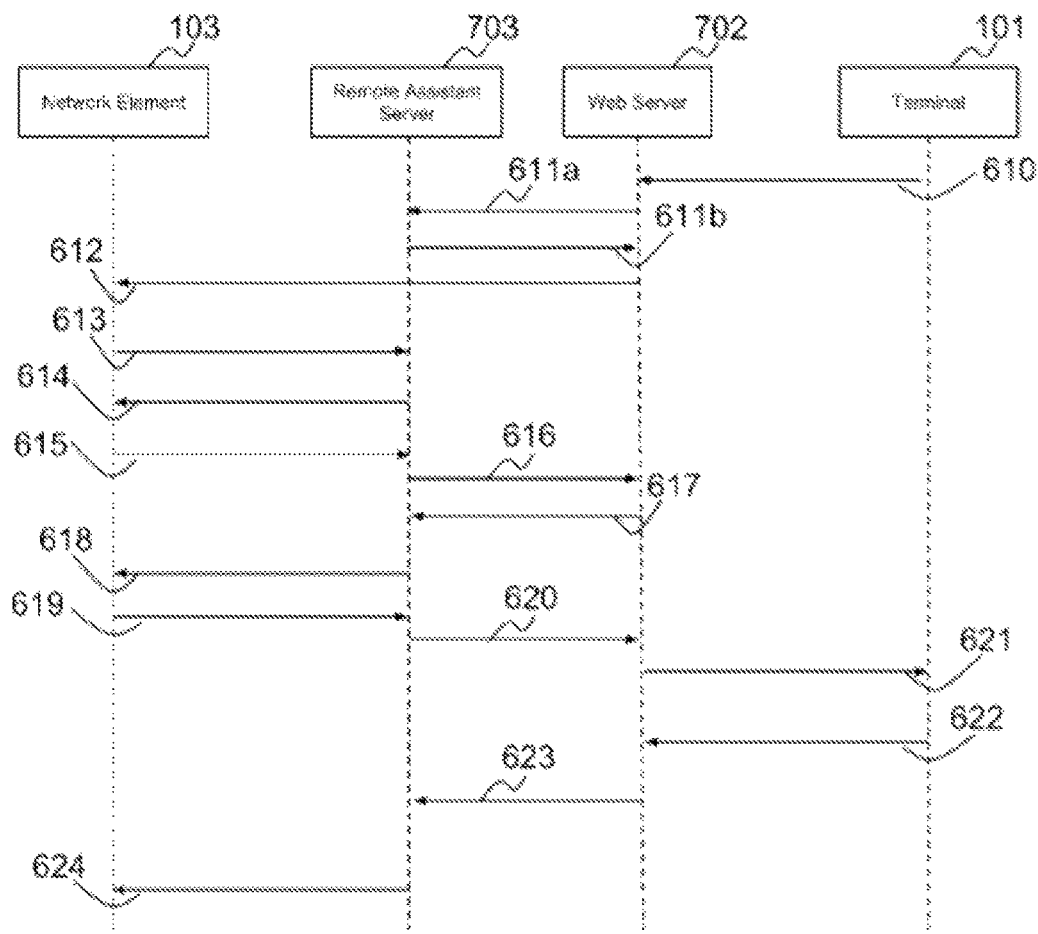
[Fig. 6]

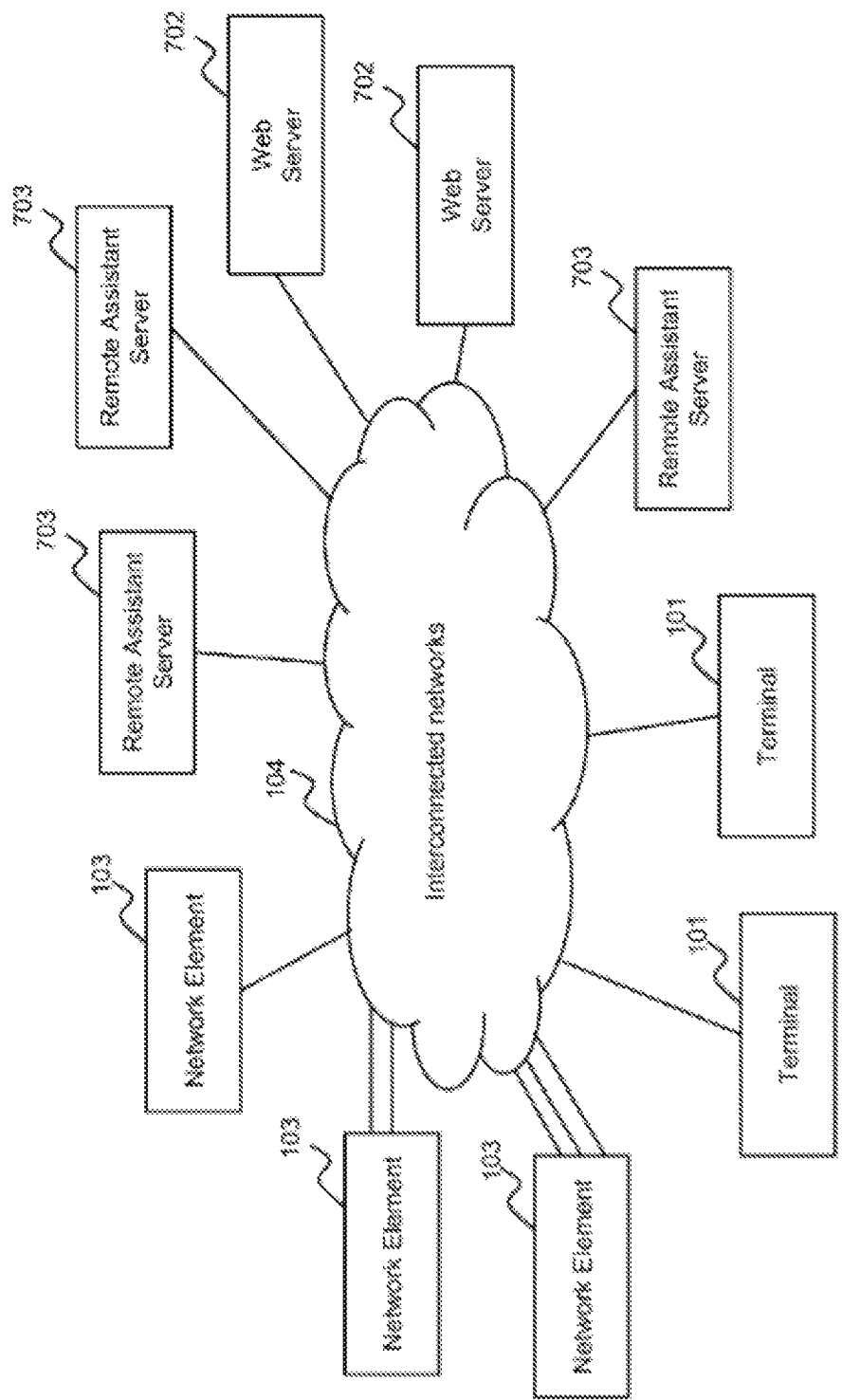
[Fig. 7]

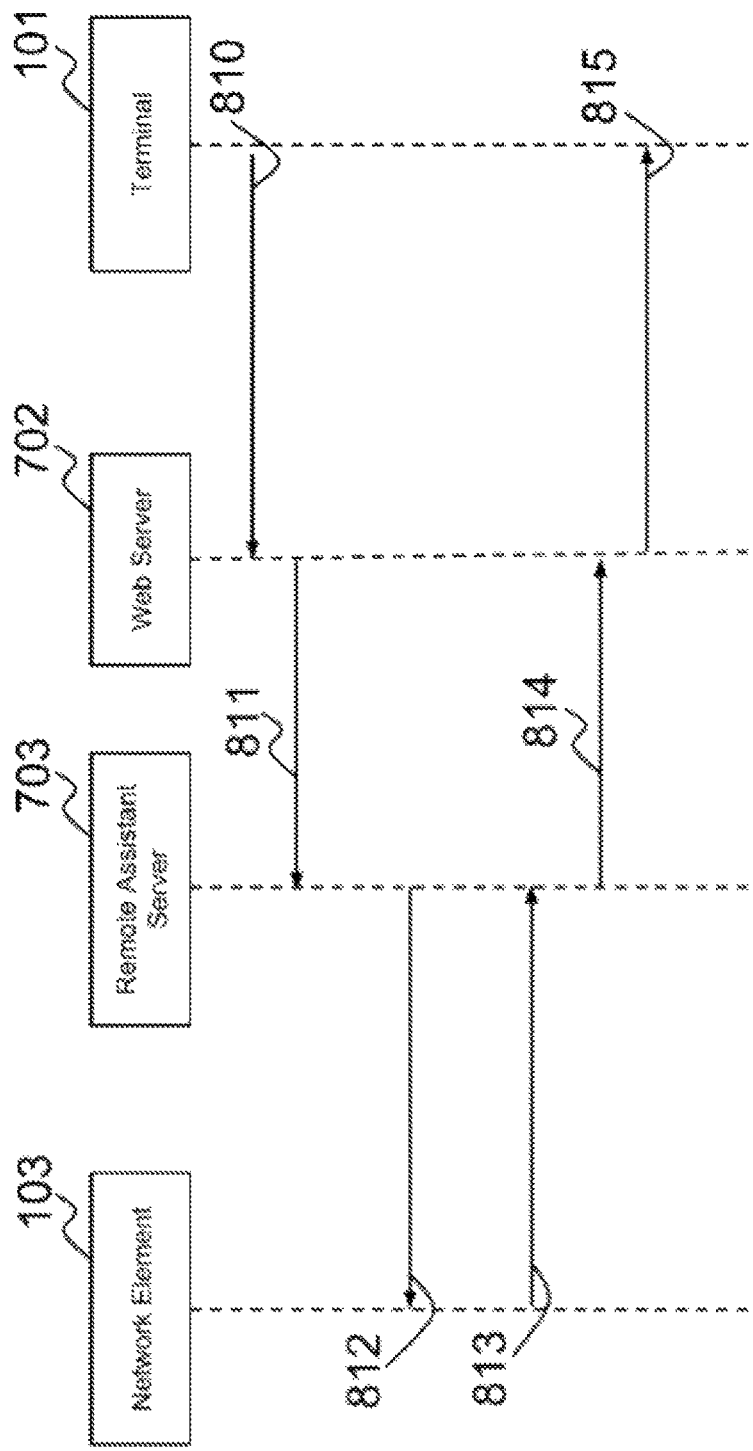

METHODS AND SYSTEMS FOR FORWARDING DATA

TECHNICAL FIELD

The present invention relates in general to the field of computer networks. More particularly, the present invention relates to a method carried out at a management server for forwarding data between a network element and a terminal.

BACKGROUND ART

It is common that in order to configure a remote network element, an administrator of the remote node needs to log into the remote network element to perform the configuration. If the device is not reachable through a public IP address, a Virtual Private Network (VPN) connection or a tunnel needs to be established with the remote network element before the administrator can log into the remote network element. Therefore, it is common for network element to send IP packets to a management server to work around the network address translation (NAT) issues. There are many other techniques known to those skilled in the arts for NAT transversal, such as those discussed in http://en.wikipedia.org/wiki/NAT traversal.

When an administrator needs to configure a large number of remote network elements, it may require a lot of the administrator's effort as the administrator needs to set up many VPNs or tunnels or use NAT traversal techniques to communicate with the large number of remote network elements.

To the make the matters worse, if a network element can only be configured through a web page, the administrator needs to first enter the user identification and authentication information manually through the web page and then click through many buttons and enter information to configure the network element. When there are a large number of network elements, the process to manually enter user identification, authentication information, and configuration information may take large amount of time.

DISCLOSURE OF INVENTION

Summary

The present invention discloses methods and systems to address the problems discussed in the background section. According to various embodiments of the present invention, an administrator can configure and manage one or more local or network element through a management server. According to various embodiments of the present invention, upon receiving a request from the administrator to manage or configure a first network element, the management server determines whether a first connection has been established with the first network element. If the first connection has not been established, the management server establishes the first connection. Then the management server forwards data between the first network element and the terminal using the first connection and during a first data session.

According to one of the embodiments, the first connection is established using Secure Shell (SSH) or Control and Provisioning of Wireless Access Points (CAPWAP). The first connection can be associated with a port. The first connection can also be associated with a session identifier.

According to one of the embodiments, the management server instructs the first network element to establish the first connection through a second connection. The second connection may have already been established between the management server and the first network element before the management server instructs the first network element to establish the first connection.

The management server may comprise a remote assistance server and a web server. The remote assistance server and the web server can be located in a same local area network (LAN). The remote assistance server connects to the first network element through the first network element through the first connection and the web server connects with the terminal through the first data session.

The first network element has a plurality of wide area network (WAN) interfaces. The first connection can be established through a first WAN interface of the plurality of WAN interfaces. If first connection is terminated, it can be re-established via a second WAN interface of the plurality of WAN interfaces of the first network element.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function Embodiments, or portions thereof, may be embodied in program instructions operable upon a processing unit for performing functions and operations as described herein. The program instructions making up the various embodiments may be stored in a storage medium The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term "computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fiber optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

FIG. 1 shows an exemplary network configuration according to various embodiments of the present invention. With reference to FIG. 1, there is a plurality of network elements 103. Network elements 103 connect to interconnected networks 104, such as the Internet. Network elements 103 have at least one network interface to connect to interconnected networks 104. For example, one of network element 103 may have two WAN interfaces to connect to interconnected networks 104. One of the WAN interfaces connect to a wireless communication network and another WAN interface connect to a digital subscriber line (DSL) provided by an ISP. Therefore the network element 103 can connect to interconnected networks 104 through the wireless communication network and the DSL.

Network element 103 comprises a processing unit, a main memory, a system bus, a secondary storage, and at least one network interface. The processing unit and the main memory are connected to each other directly. The system bus connects the processing unit directly or indirectly to the secondary storage, and the network interface(s). Using the system bus allows network element 103 to have increased modularity. The system bus couples the processing unit to the secondary storage, and the network interface(s). The system bus can be any of several types of bus structures including a memory bus, a peripheral bus, and a local bus using any of a variety of bus architectures. The secondary storage stores program instructions for execution by the processing unit. The scope of the invention is not limited to network element 103 having one network interface only, such that network element 103 may have one or more network interfaces. Network element 103 may be a network node, such as access point, router, and gateway. Network element 103 may also be a host, such as computer, smartphone, and server. Network element 103 can also be any electronic devices that can communicate using Internet Protocol (IP), particularly IP version 4 and IP version 6.

One or more terminals 101 and management server 102 also connect to interconnected networks 104.

Management server 102 can be a router, a network node, a server, a desktop, a laptop, a mobile device or any electronic device that is capable of performing the functions of a management server. The management server can be located in the same network of network elements or terminals or can be located in a remote network.

A terminal, such as terminals 101, comprises a display or other output device, such as a cathode ray tube (CRT), plasma display, or a liquid crystal display (LCD), for displaying information to an administrator or user of the terminal. A terminal also comprises an input device to allow the administrator or user of the terminal to communicate information and command selections to a processing unit. The terminal can be a network node, a network host, a server, a desktop, a laptop, a mobile device or any electronic device that is capable of performing the functions of a terminal. The terminal can be located in the same network of network elements or management server or can be located in a remote network.

Terminal 101 further comprises a processing unit, a main memory, a system bus, a secondary storage, and at least one network interface. The processing unit and the main memory are connected to each other directly. The system bus connects the processing unit directly or indirectly to the secondary storage, the output device, the input device and the network interface(s). Using the system bus allows terminal 101 to have increased modularity. The system bus couples the processing unit to the secondary storage, and the network interface(s). The system bus can be any of several types of bus structures including a memory bus, a peripheral bus, and a local bus using any of a variety of bus architectures. The secondary storage stores program instructions for execution by the processing unit. The scope of the invention is not limited to terminal 101 having one network interface only, such that terminal 101 may have one or more network interfaces.

FIG. 2 is an illustrative block diagram of a management server, such as management server 102 according to one of the embodiments of the present invention. Management server 102 comprises processing unit 200, main memory 201, system bus 202, secondary storage 203, and network interface 204. Processing unit 200 and main memory 201 are connected to each other directly. System bus 202 connects processing unit 200 directly or indirectly to secondary storage 203, and network interface 204. Using system bus 202 allows management server 102 to have increased modularity. System bus 202 couples processing unit 200 to secondary storage 203, and network interface 204. System bus 202 can be any of several types of bus structures including a memory bus, a peripheral bus, and a local bus using any of a variety of bus architectures. Secondary storage 203 stores program instructions for execution by processing unit 200. The scope of the invention is not limited to management server 102 having one network interface only, such that management server 102 may have one or more network interfaces.

FIG. 3 is a flowchart illustrating a process according to one of the embodiments of the present invention. At step 301, management server 102 receives a request from terminal 101 for communicating with network element 103. The request is received during a first data session.

The request can be in the form of a string of text, numbers or a combination of text and numbers. When management server 102 receives the request from terminal, processing unit 200 checks whether the request is valid. For example, the request can be a uniform resource locator (URL) and the URL is provided by processing unit 200 of management server 102 through a web-page. The web-page content is provided to terminal 101 during the first data session. URL is embedded in web-page as a hyperlink. When terminal 101 has received and processed web-page, processing unit of terminal 101 is able to identify the URL. When processing unit of terminal 101 decides to request to be allowed to communicate with network element 103, it makes the request by accessing the URL. It is preferred that a session identifier is sent along with the request in order to let processing unit 200 of management server 102 know that the request is authenticated.

In another example, a request can be a message sent to the Internet Protocol (IP) address of management server 102 along with the session identifier. In another example, the request is sent through a TCP session to management server 102.

At step 302, processing unit 200 of management server 102 determines whether a first connection with network element 103 has been established.

There are myriad ways to determine whether the first connection has been established and to determine the status of the first connection. For example, processing unit 200 of management server 102 can maintain a database to record connections that have been established and periodically sends probing packets to determine the status of connections. In another example, a network statistics command can be issued to check network connections (both incoming and outgoing), routing tables, and a number of network interfaces (network interface controller or software-defined network interface) and network protocol statistics. Then processing unit 200 of management server 102 can examine whether the first connection is in the network statistics.

If processing unit 200 of management server 102 has determined that the first connection with network element 103 has not been established, it establishes the first connection with network element 103 at step 303.

Step 304 is an optional step, processing unit 200 of management server 102 maintains the first connection if the first data session is not terminated. As the first connection could be terminated for myriads of reasons, processing unit 200 of management server 102 periodically checks the status of the first connection during the first data session. If the first connection is terminated, processing unit 200 of management server 102 re-establishes the first connection. In one variant, processing unit 200 of management server 102 does not proactively maintain the first connection regardless of whether the first data session is not terminated. This is because the first connection can be used by many terminals for other reasons not related to forwarding data. In one variant, a first connection can be terminated even if the first data session still remains active. This is because the first data session is not used only to send or receive data from network element 103.

At step 305, as processing unit 200 of management server 102 has confirmed that the first connection is in operation, management server 102 then forwards data between network element 103 and terminal 101 using the first connection during the first data session.

Management server 102 has myriads ways to forward data in step 305. In one example, management server 102 can encapsulate the arriving IP packets that hold the data from terminal 101 in other IP packets first and then forward the other IP packets to network element 103. In another example, when network element 103 sends a web page as a reply to a request to terminal 101 through management server 102, network element 103 encapsulates the original IP packets holding the web page data in other IP packets first, and then the other IP packets are sent to management server 102 through the first connection using CAPWAP protocol. When management server 102 receives the other IP packets, it decapsulates original IP packets and forwards the original IP packets to terminal 101. Therefore, the first connection is being used to forward data. The web page may be suitable for the World Wide Web and the web browser. The web page is usually written in HTML or comparable mark-up language, whose main distinction is to provide hypertext that will navigate to other web pages via links. The web page may comprise style sheets, scripts, images, videos and audios. The content of the web page includes administrative information, management information, configuration, status, network performance, and other information collected or generated by network element 103.

In another example, if management server 102 is connected to terminal 103 through a tunnel or VPN connection, management server 102 can first encapsulate original first IP packets received from network element 103 in other second IP packets and then send the other second IP packets to terminal 101. Terminal 101 can then decapsulate the original first IP packets from the other second IP packets. Similarly, terminal 101 can first encapsulate original third IP packets in other fourth IP packets and then send the other fourth IP packets to management server 102. When management server 102 receives the other fourth IP packets, it decapsulates the original third IP packets. Management server 102 then encapsulates the original third IP packets in other fifth IP packets and sends the other fifth IP packets to network element 103. Network element 103 can then decapsulate original third IP packets from other fifth IP packets.

In one variant, management server 102 may modify the data before forwarding the data in step 305. For example, management server 102 may modify webpage content encapsulated using CAPWAP protocol after decapsulating the webpage. Then forward the modified webpage to terminal 101 in step 305.

In one embodiment, management server 102 performs as a forwarding proxy, CGI proxy or web proxy.

According to one of the embodiments of the present invention, if the first data session is terminated, management server 102 stops forwarding the data received from terminal 101 as management server 102 may not be able to confirm that terminal 101 is still secured or authenticated.

The first data session is established after terminal 101 is authenticated with management server 102. The authentication can be performed through a website, exchange of messages, OpenID, OAuth, authentication service provided a third party and/or other authentication methods. The protocol used for the first data session to carry data can be Hypertext Transfer Protocol (HTTP), Hypertext Transfer Protocol Secure (HTTPS), Telnet, SSH, etc.

For an illustration purpose, when a user logs in to management server 102 from terminal 101, a first data session is established after the user has authenticated management server 102. The user can send instructions to management server 102 and receive data from management server 102 during the first data session. The user, for example, during the first data session, can access a web page from one of network elements 103 through management server 102 during the first data session. In addition, the user can access other network elements 103 through management server 102 during the same first data session. Management server 102 performs the function of forwarding data between terminal 101 and network elements 103. The use of the first data session may remove the need for the user to authenticate more than once with management server 102 from terminal 101.

The first connection is used to forward data received from terminal 101 to network element 103 by management server 102 and is also used to forward data received from network element 103 to terminal 101 by management server 102.

The first connection can be established using Transmission Control Protocol (TCP), User Datagram Protocol (UDP), Secure Shell (SSH), Point-to-point Protocol (PPP), Control and Provisioning of Wireless Access Points (CAPWAP), Virtual Private Network (VPN) or other protocols. It is preferred to use SSH because SSH is able to provide persistent and secured connection. In order to maintain the first connection, processing unit 200 of management server 102 periodically sends packets through the first connection to keep the connection. The same can be performed by network element 103. The first connection is not restricted to using connection oriented protocol and can be implemented by connectionless protocol.

In order to establish the first connection, management server 102 may initiate the process if management server 102 can directly communicate with network element 103. However, in case that network element 103 cannot be communicated directly, for example, network element 103 is using an IP address that requires network address translation and/or behind a firewall, the establishment of the first connection may need to be initiated by network element 103. There are myriad ways for management server 102 to instruct network element 103 to establish the first connection. For example, network element 103 may have already established a second connection with management server 102 and management server 102 can send the instruction to network element 103 through the second connection. In another example, network element 103 may have another network interface that management server 102 can send message to, such that management server 102 may send a request to another network interface to request network element 103 to initiate establishing the first connection.

In one variant, network element 103 periodically and frequently communicates with management server 102 by forwarding packets to management server 102. Therefore, when management server 102 replies to the packets, processing unit 200 of management server 102 can piggyback the instruction to establish the first connection to network element 103 with the reply packets.

Management server 102 may have a plurality of connections that connect to a plurality of network elements 103. Therefore, management server 102 can forward data from one terminal 101 to the plurality of network elements 103. Similarly, management server 102 can forward data between a network element 103 and a plurality of terminals.

According to one of the embodiments of the present invention, network element 103 initiates the establishment of the first connection and tries to maintain the first connection. Therefore network element 103 and management server 102 can exchange data whenever necessary, including when management server 102 forwards data between terminal 101 and network element 103. In this case, there is no need to have the second connection as first connection is also used as the second connection. In a preferred embodiment, network element 103 is provided with a URL, IP address and/or host-name of management server 102. Therefore network element 103 is able to establish the first connection with management server 102 by using the URL, IP address and/or host-name. The URL, IP address and/or host-name can be preconfigured by the vendor of network element 103 or entered by the administrator of network element 103.

FIG. 4A is a sequence diagram illustrating how management server 102 forwards data between network element 103 and terminal 101 according to one of the embodiments of the present invention. At communication step 401, terminal 101 sends data carried by at least one IP packet to management server 102. The payload of the at least one IP packet holds the data. The source IP address and the destination IP address of the at least one IP packet are the IP address of a network interface of terminal 101 and the IP address of a network interface of management server 102 respectively. Then when management server 102 receives the at least one IP packet, it updates the source IP address and destination address of the at least one IP packet to be the IP address of a network interface of management server 102 and the IP address of a network interface of network element 103 respectively. Then management server 102 forwards the at least one IP packet to network element 103 at communication step 402.

At communication step 403, network element 103 sends data carried by at least another one IP packet to management server 102. The payload of the at least another one IP packet holds the data. The source IP address and the destination IP address of the at least another one IP packet are the IP address of a network interface of network element 103 and the IP address of a network interface of management server 102 respectively. Then when management server 102 receives the at least another one IP packet, it updates the source IP address and destination address of the at least another one IP packet to be the IP address of a network interface of management server 102 and the IP address of a network interface of terminal 101 respectively. Then management server 102 forwards the at least one IP packet to terminal 101 at communication step 404.

In one variant, management server 102 performs encapsulation and decapsulation when forwarding data. As data carried by IP packets through the first data session and the first connection may be in different protocols, data needs to be decapsulated and then encapsulated in order to ensure the recipient network element can use the data. For example, data is sent by terminal 101 using HTTPS protocol and the first connection is established using SSH protocol. Therefore management server 102 decapsulates data from the HTTPS protocol sent from terminal 101 and then encapsulates the data in IP packets for network element 103 using SSH protocol.

FIG. 4B is a sequence diagram illustrating communication steps according to one of the embodiments of the present invention. In the case that the first connection has not been established between management server 102 and network element 103, management server 102 instructs network element 103 to establish the first connection in communication step 411. The instructions can be sent through a connection that has already been established or any other means that can inform network element 103 about the instruction. The reason for having network element 103 to establish the first connection is because network element 103 may be protected by a firewall, using translated network address or any other reasons that management server 102 cannot communicate with network element 103 before network element 103 initiates the communication.

When network element 103 receives the instruction, it establishes the first connection at communication step 412. Management server 102 may forward acknowledgement to network element 103 after the first connection has successfully been established. At communication step 421, terminal 101 requests to send or receive data from network element 103 by establishing a first data session. If the request is accepted, management server 102 provides terminal 101 a session identifier at communication step 422 and management server 102 can then forward data between network element 103 and terminal 101 according to the communication steps illustrated in FIG. 4A.

When a session identifier is used by terminal 101, the session identifier allows terminal 101 to be recognized when management server 102 receives data from the terminal 101 during the first data session.

When a session identifier is used by network element 103, the session identifier allows network element 103 to be recognized when management server 102 receives data from the network element 103 through the first connection.

For the sake of easy reading, the session identifier used by terminal 101 is referred to as the first session identifier and session identifier used by network element 103 is referred to as the second session identifier. The first session identifier and the second session identifier may be provided by the management server 102. This allows management server 102 to distinguish different first session identifiers when there are a plurality of terminals 101 and distinguish different second session identifiers when there are a plurality of network elements 103. Therefore when terminal 101 has successfully authenticated with management server 102, management server 102 sends the first data session identifier to terminal 101 and terminal 101 can use the first session identifier during the first data session. Similarly, when network element 103 has established the first connection with management server 102, management server 102 sends the second session identifier to network element 103. Then network element 103 may then send the second session identifier to management server 102 through the first connection. In one variant, there is no need to send the second session identifier as management server can use the IP address of the network element 103 as a second session identifier.

Those who are skilled in the art would appreciate that there are myriad techniques to create a session identifier. For example, a session identifier can be created according to an IP address, a port number, a time-stamp and/or a string. A session identifier should be unique in order to avoid confusion. A session identifier can be reused when the associated session is terminated or no longer alive.

According to one of the embodiments of the present invention, management server 102 periodically checks if the first connection with network element 103 is still active or is terminated. If the first connection is not active or is terminated, the associated second session identifier can be released or retired in order to reduce loading on computing resources. Similarly, management server 102 periodically checks if the first data session with terminal 101 is still active or is terminated. If the first data session is not active or is terminated, the associated first session identifier can be released or retired in order to reduce loading on computing resources.

For example, a session identifier can be implemented by using HTTP cookie or HTTPS cookie. When terminal 101 sends data to management server 102, during the first data session the first session identifier is sent along with the data. Such that processing unit 200 of management server 102 is able to associate the data that it receives to the terminal 101. The first session identifier may be set and sent by processing unit 200 of management server 102 when terminal 101 has successfully authenticated with the management server.

It is preferred that the first session identifier and second session identifier are sent through a secured connection and/or is encrypted, such that this makes the first session identifier and second session identifier less likely to be exposed via eavesdropping.

In one variant, processing unit 200 of management server 102 invalidates the first session identifier after the first data session is terminated. Therefore, processing unit 200 of management server 102 considers that any further data from terminal 101 sent along with the invalidated first session identifier is not authenticated in order to ensure authenticity. The same also applies to the second session identifier. Those who are skilled in the art would appreciate that a first data session can be terminated due to myriad of conditions, such as log-out, unstable network connection, and/or time expiration.

In one variant, communication steps 421 and 422 are performed before communication step 422. Management server 102 does not perform communication step 411 until after communication steps 421 and 422. For example, in step 421, terminal 101 sends a request to check the clients list of network element 103 to network element 103. By performing communication step 422 before communication step 412, management server 102 can respond to terminal 101 before a reply is received from network element 103. The benefits for performing communication step 411 and 412 before communication steps 421 and 422 include that the user of terminal 101 may receive faster response and result in better user experience. The benefits for performing communication step 411 and 412 after communication steps 421 and 422 include conserving computing and network resources as the first connection is established with the network element 103 only after a request is received from first terminal 101.

FIG. 4C is a sequence diagram illustrating communication step according to one of the embodiments of the present invention. In this illustration, the first connection has not been established between management server 102 and network element 103. When terminal 101 has requested to access a web page hosted at network element 103 at communication step 431, management server 102 then tries to establish the first connection by instructing network element 103 to establish the first connection at communication step 432. The instruction can be sent through a second connection or by other means. The instruction may include information regarding how the first connection should be established.

At communication step 433, network element 103 establishes the first connection according to the instruction received in communication step 432. When management server 102 has identified that the first connection has been established, it forwards the request from terminal 103 received in communication step 431 to network element 103 in communication step 434 through the first connection. When network element 103 replies to the request, it provides the web page content through the first connection in communication step 435.

At communication step 436, management server 102 then forwards the web page content to terminal 101. In one variant, management server 102 does not forward the web page content to terminal 101 if the first data session is terminated or broken.

In one variant, terminal 101 does not need to provide authentication information to authenticate with network element 103 as the authentication information is provided by management server 102. For example, when a user of terminal 101 requests to access a web page from network element 103, terminal 101 does not provide authentication information. The authentication information is provided by management server in communication step 432 or 434. It is preferred to provide the authentication information in communication step 434 as the purpose of communication step 432 is mainly for establishment of the first data connection. The authentication information can be stored in a storage medium of management server 102, such as secondary storage 203 or main memory 201. Alternatively, there is no log-in process required or no authentication information is required when terminal 101 recognizes the request is forwarded by management server 102.

According to one of the embodiments of the present invention, FIG. 5 shows one of webpages, such as webpage 501 provided by management server 102 to terminal 101 after a user of terminal has successfully authenticated with management server 102 during a first data session. Webpage 501 provides information about network element 103. For example, the device name of network element 103 is "Device A" and has serial number "1234-1234-1234". When the user clicks on hypertext link 502 (labelled as "Visit"), management server 102 then requests a web administration page from network element 103, i.e. "Device A". Authentication information for network element 103 is provided by management server 102. The web administration page received from network element 103 may be modified by management server 102 before send to terminal 101.

In another example, management server 102 provides the user identification and password information along with the request in communication step 434. The benefit of using management server 102 to perform the authentication is to centralize management and/or reduce the need to have the authentication step. As terminal 101 has already authenticated with management server 102 when establishing the first data session, the security risk that network element 103 is being accessed by an unauthenticated user is small if the request is forwarded through the first connection. In one variant, when the first connection is using SSH protocol, the web page provided by network element 103 is tunnelled through SSH to management server 102. Then management server 102 decapsulates the web page from the SSH tunnel and forwards the web page to terminal 101. In one variant, management server 102 does not provide authentication information, such that terminal 101 or the user of terminal 101 has to authenticate with network element 103.

In one variant, after management server 102 has received data from terminal 101 in communication step 431, management server 102 examines the data and modifies the data if necessary before forwarding the data or modified data to network element 103. Similarly, after management server 102 has received data from network element 103 after communication step 435, management server 102 examines the data and modifies the data if necessary before forwarding the data or modified data to terminal 101. For example, network element 103 provides a web administration page at communication step 435 through the first connection. The first connection, for illustration purpose, is a CAPWAP tunnel. The web administration page can be sent using HTTP or HTTPS protocol. The IP packets holding the web administration page data are encapsulated in another IP packets and then sent through the CAPWAP tunnel. When management server 102 has received data from network element 103 after communication step 435, management server 102 decapsulates the IP packets from the CAPWAP tunnel in order to extract the IP packets holding the web administration page. Then management server 102 examines the web administration page and determines whether to modify the web administration page. For illustration purpose, management server 102 may decide to modify cookies of the web administration page and add/remove certain elements from the web administration page in order to enhance user experience, improve security, and/or to have better network utilization. The elements that may be removed from the web administration page include a log-out button as the log-out process should be performed by management server 102, instead of by terminal 101. Another element that may be modified includes hyperlinks because the host-name of hyperlinks may be modified to be the host-name or IP address of management server 102 in order to have management server 102 to perform data forwarding function. After the web administration page has been modified, management server 102 forwards the modified web administration page to terminal 101 at communication step 436. When terminal 101 receives the modified web administration page, it can then provide the modified web administration page to a user of terminal 101 through a browser or the modified web administration page can be further processed by the processing unit of terminal 101 according to instruction codes stored at terminal 101.

Processing unit 200 of management server 102 may determine to modify the data received from terminal 101 or from network element 103 according to one or more configurations. The configurations can be defined by a user or administrator of management server 102. The configuration may be retrieved locally from secondary storage 203 or main memory 201 or remotely from a remote server and is received through a web interface an application programming interface (API), a command line interface or a console. The configurations can be based on the content of the data. The configuration can be in the form of program instructions stored in secondary storage 203 or main memory 201. Alternatively the configuration can be in the form of an algorithm as a function of the content of the data.

According to one of the embodiments of the present invention, network element 103 has a plurality of WAN interfaces that are capable of connecting to interconnected networks 104. For illustration purpose, a WAN interface of network element 103 is connected to interconnected networks 104 via a wireless communication modem through a wireless connection provided by a cellular service provider and another WAN interface of network element 103 is connected to interconnected networks 104 via a Ethernet cable through a wired connection provided by a digital subscriber line (DSL) service provider.

Therefore network element 103 is able to establish the first connection via one of its WAN interfaces which is connected to the interconnected networks 104. Those skilled in the arts would appreciate that there are myriad of methods for network element 103 to decide which WAN interface is used. For example, processing unit of network element 103 may choose the WAN interface randomly, according to a predefined policy, in a round-robin style, etc.

In the case that the first connection is terminated or become unstable, processing unit of network element 103 can select another WAN interface that is connected to interconnected networks 104 for re-establishing the first connection. Processing unit of network element 103 may determine that the first connection is unstable if the first connection has experienced lots of packet loss or increasing packet loss. Those who are skilled in the arts would also appreciate that there are myriad of methods for network element 103 to decide which WAN interface is used to re-establish the first connection. For example, processing unit of network element 103 may select the WAN interface randomly, according to a predefined policy, in a round-robin style, etc.

According to one of the embodiments of the present invention, network element 103 is able to establish the second connection via one of its WAN interfaces which is connected to interconnected networks 104. Those who are skilled in the arts would appreciated that there are myriad of methods for processing unit of network element 103 to decide which WAN interface is used for establishing the second connection. For example, the processing unit of network element 103 may choose the WAN interface randomly, according to a predefined policy, in a round-robin style, etc.

FIG. 7 illustrates a network configuration according to various embodiments of the present invention. There are a plurality of remote assistance servers 703 and a plurality of web servers 703. The plurality of remote assistance servers 703 and the plurality of web servers 703 comprised in one management server, as a management server comprises at least one remote assistance server and at least one web server.

In one variant, management server 102 hosts at least one remote assistance server 703 and at least one web server 702 by virtualization. This allows the administrator of management server 102 to create and remove remote assistance servers and web servers to adapt to changing needs.

In one variant, remote assistance server 703 and web server 702 are different modules of management server 102, such that program instructions stored at secondary storage 203 or main memory 200 are executed by processing unit 200 of management server 102 to perform the functions of remote assistance server 703 and web server 702. For example, processing unit 200 of management server 102 executes a piece of Apache HTTP Server software to perform the functions of web server 702 and executes a piece of OpenSSH server to perform the functions of remote assistance server 703.

FIG. 6 is a sequence diagram illustrating one of the embodiments according to the present invention. Comparing to FIG. 4A, FIG. 4B, and FIG. 4C, web server 702 and remote assistance server 703 together performs the functions offered by management server 102.

When terminal 101 has made a request to web server 702 for accessing a web page of network element 103 at communication step 610, web server 702 first determines if a first connection has been established between remote assistance server 703 and network element 103. Web server 702 queries remote assistance server 703 in communication step 611a whether a first connection has been established between remote assistance server 703 and network element 103. Remote assistance server 703 replies in communication step 611b. In one variant, remote assistance server 703 provides a port number to web server 702 for web server 702 to bind or associate the first data session with the port number. In one variant, the port number is not provided in communication step 611b but in communication step 616.

In one variant, web server 702 has recorded whether the first connection is established or not. Therefore, web server 702 does not need to query remote assistance server 703 and there is no need to perform communication steps 611a and 611b.

If the first connection has not been established, web server 702 then tries to establish the first connection by instructing network element 103 to establish a first connection at communication step 612 with remote assistance server 703. The instruction can be sent through a second connection or by other means. The instruction may include information regarding how the first connection should be established.

At communication step 613, network element 103 queries remote assistance server 703 for additional information for establishing the first connection. At communication step 614, remote assistance server 703 provides the additional information to network element 103. Then, in communication step 615, network element 103 establishes the first connection with remote assistance server 703 according to the instruction received in communication step 612 and the additional information received in communication step 614.

One of the reasons for communication steps 613 and 614 is for network element 103 to find out the additional information that may assist remote assistance server 703 to process data received from network element 103. The additional information may include port number, protocol, IP address, and etc. For example, in communication step 613, network element 103 queries remote assistance server 703 a port number that remote assistance server 703 uses for relaying data between network element 103 and terminal 101. When remote assistance server 703 replies with a port number in communication step 614, network element 103 can then include the port number when it sends data to remote assistance server 703 in communication step 615. The port number provided to network element 103 is the same port number provided to web server 702 in communication step 611b or 616. One of the purposes of using a port number for relaying data between network element 103 and terminal 101 is to allow remote assistance server 703 to forward data received from web server 702 at the port number to network element 103 and also to forward reply data received from network element 103 to web server 702. This also allows web server 702 to associate the first session identifier with a port, which is specified by the port number. The association allows quick response and less computer resource requirement. In one variant, a first session identifier can be bounded or associated with a plurality of port numbers. Therefore, terminal 101 may access information from a plurality of network elements 103 through the first data session. In one variant, an IP address of network element 103 is sent along with the port number and data in step 615 as some of SSH server only listens to a specific IP address, such as 127.0.0.1, unless configured otherwise. The use of the port number and the IP address is to inform remote assistance server 703 which IP address and port number it should listen to while relaying data between network element 103 and terminal 101. In one variant, when there is a plurality of network elements 103, each network element 103 sends a unique set of port number and IP address along with data in communication step 615. The unique set of port number and IP address allows remote assistance server 703 to distinguish data received from one network element 103 from data received from another network element 103.

In one variant, communication steps 613 and 614 are omitted if web server 702 provides the additional in communication step 612. The additional information is first provided by remote assistance server 703 to web server 702 in communication step 611b.

In communication step 616, remote assistance server 703 informs web server 702 that the first connection has been established.

When web server 702 has identified that the first connection has been established, it forwards the request from terminal 101 received in communication step 610 to remote assistance server 703 in communication step 617. Then remote assistance server 703 forwards the request through the first connection in communication step 618. When network element 103 replies to the request, it provides the web page content through the first connection in communication step 619 to remote assistance server 703.

In communication step 620, remote assistance server 703 forwards the reply to web server 702. In communication step 621, web server 702 forwards the reply to terminal 101.

When terminal 101 sends data or request to network element 101 through web server 702 and remote assistance server 703, there is no need to establish the first connection again as the first connection has already been established. In another example, when terminal 101 has sent data intended for network element 103 to web server 702 in communication step 622, web server 702 forwards the data to remote assistance server 703 in communication step 623. Then remote assistance server 703 forwards the data to network element 103 in communication step 624.

It is preferred that the communication between remote assistance server 703 and web server 702 is secured. It is also preferred that remote assistance server 703 cannot be accessed unless it is accessed through the first connection and/or through web server 702. Remote assistance server 703 and web server 702 can be collocated in the same local area network (LAN). Remote assistance server 703 and web server 702 can also be located in different networks and connected through a secured connection. For example, remote assistance server 703 is located in a first data center and web server 702 is located in a second data center. The communication between remote assistance server 703 and web server 702 can be carried by the Internet. In one variant, remote assistance server 703 and web server 702 are connected by a virtual private network (VPN) through the Internet.

As remote assistance server 703 and web server 702 can together comprise management server 102, remote assistance server 703 can form a plurality of connections with different network elements and web server 702 can also establish a plurality of sessions with different terminals. The number of remote assistance server 703 and web server 702 may be the same or different in order to suit different needs and network configurations. As remote assistance server 703 is used to communicate with one or more network element 103, when there are more network elements 103, more remote assistance servers 703 may be required in order to have the capacity to communicate with network elements 103. When there are more data sessions to be maintained with more terminals 101, more web servers 702 may be required in order to have the capacity to communicate with terminals 101. For example, an administrator may manage and/or configure millions of network elements 103, such as electronic meters and sensors, by establishing a connection with web server 702. After the connection is established, a first data session is established between the terminal used by the administrator and web server 702. Web server 702 may be connected to hundreds of remote assistance servers 703 through an intranet and/or the Internet. Remote assistance servers 703 communicate with the millions of network elements 103 through corresponding connections.

According to one of the embodiments of the present invention, after web server 702 has received data originated from network element 103 in communication step 619 from remote assistance server 703 after communication step 620, web server 702 examines the data and modifies the data if necessary before forwarding the data or modified data to terminal 101. Similarly, after web server 702 has received data from terminal 101 after communication step 622, web server 702 examines the data and modifies the data if necessary before forwarding the data or modified data to remote assistance server 703. Then remote assistance server 703 forwards the data or modified data to network element 103 through the first connection in step 624.

For example, network element 103 provides a web administration page at communication step 619 through the first connection. The first connection, for illustration purpose, is a SSH tunnel. The web administration page can be sent using HTTP or HTTPS protocol. The IP packets holding the web administration page data are encapsulated in another IP packets and then sent through the SSH tunnel. When remote assistance server 703 has received data from network element 103 after communication step 620, remote assistance server 703 decapsulates the IP packets from the SSH tunnel in order to extract the IP packets holding the web administration page. Then remote assistance server 703 forwards the IP packets holding the web administration page to web server 702 at communication step 620. Then at communication step 621, web server 702 examines the web administration page and determines whether to modify the web administration page. For illustration purpose, web server 702 may decide to modify cookies of web administration page and add/remove certain elements from the web administration page in order to enhance user experience, improve security, better network utilization. The elements that may be removed from the web administration page include a log-out button as the log-out process should be performed by web server 702, instead of by terminal 101. Another element that may be modified include hyperlinks because the hostname of hyperlinks may be modified to be the host-name or IP address of web server 702 in order to have web server 702 and remote assistance server 703 together to perform data forwarding function. After the web administration page has been modified, management server 102 forwards the modified web administration page to terminal 101 at communication step 621. When terminal 101 receives the modified web administration page, it can then provide the modified web administration page to a user of terminal 101 through a browser or be further processed processing unit of terminal 101 according to instruction codes stored at terminal 101.

According to one of the embodiments of the present invention, when web server 702 modifies data received from terminal 101 and/or data originated from network element 103, web server 702 modifies HTTP or/and HTTPS header information to request or response of a webpage. For example, web server 702 modifies the HTTPS header to add additional information in the HTTPS header and the additional information is not common. When network element 103 receives a request for its administration or configuration webpage, network element 103 recognizes the additional information in the header, then network element 103 is able to confirm that the request is sent by web server 702. In one variant, after network element 103 has confirmed the additional information contained in HTTPS headers, network element 103 does not require user identification and password information before replying to the request. This allows quicker authentication and may reduce computing and networking resources. In one variant, the modification of HTTP or/and HTTPS is performed by the remote assistance server 703. In one variant, when the functions of web server 702 and remote assistance server 703 are performed by management server 102, management server 102 performs the modification. In one variant, additional information may include information that can used for network element 103 to identify what can be and what cannot be provided to terminal 101. For example, if a user of terminal 101 only has read access for information of network element 103, web server 702 may set a string in the additional information to inform network element 103 that no write access is needed. The string in the additional information can be "read only". In another example, if the user has full-access, then the string in the additional information can be "full-access".

In one variant, when a user of terminal 101 requests to access a web page from network element 103, the user does not need to log into network element 103 and provide authentication information to network element 103. The log-in process and the authentication information can be provided by web server 702. Alternatively, the log-in process can be bypassed or no authentication information is required when network element 103 recognizes the request is forwarded by web management server 702 and remote assistance server 703.

According to one of the embodiments of the present invention, web server 702 periodically checks if the first connection with network element 103 is still active or is terminated. If the first connection is not active or terminated, the associated second session identifier can be released or retired in order to reduce loading on computing resources. Similarly, web server 702 periodically checks if the first data session with terminal 101 is still active or is terminated. If the first data session is not active or terminated, the associated first session identifier can be released or retired in order to reduce loading on computing resources. In one variant, remote assistance server 703 periodically checks if the first connection with network element 103 is still active or is terminated and reports the result to web server 702, such that web server 702 can retire the second session identifier if the first connection is no longer active or is terminated.

FIG. 8 is a sequence diagram illustrating one of the embodiments according to the present invention. Network element 103 communicates with remote assistance server 703 using a first connection and CAPWAP protocol. Either one of remote assistance server 703 or network element 103 can initiate the first connection. It is preferred that the first connection is initiated by network element 103 as the IP address of network element 103 may not be permanent, behind firewall, and/or being changed by NAT. The first connection has already been established before communication step 810 took place. If the first connection has not been established, terminated or broken, network element 103 may periodically try to re-establish the first connection with remote assistance server 703.

When terminal 101 has made a request to web server 702 for accessing a web page of network element 103 at communication step 810, the request is sent during a first data session. Web server 702 then forwards the request to remote assistance server 703 at communication step 811.

Then at communication step 812, remote assistance server 703 forwards the request to network element 103 through the first connection using CAPWAP protocol. At communication step 813, network element 103 replies to the request with data. The data is sent to remote assistance server 703 through the first connection using CAPWAP protocol. Remote assistance server 703 then forwards the reply with data to web server 702 in communication step 814. Finally web server 702 forwards the data to terminal 101 in communication step 815.

As there may a plurality of network elements 103 and terminals 101, there may be a plurality of first connections and a plurality of first data session respectively. For example, one of terminals 101 may request administration web pages from a plurality of network elements 103. In another example, one of network elements 103 may provide data to respond to a plurality of requests from a plurality of terminals 101. In order to distinguish requests and data, web server 702 and remote assistance server 703 may use session identifiers or port numbers for such purpose.

In one variant, the request sent in communication step 811 may be sent along with a first session identifier that is associated with the first data session. Therefore when remote assistance server 703 forwards the reply with data in communication 814, the data is sent along with the first session identifier, and web server 702 is able to associate with the data with the first data session.

Similarly, when the request is sent in communication step 812, a second session identifier is sent along with the request. Therefore when network element 103 sends the reply with data in communication 813, the data is sent along with the second session identifier, and remote assistance server 703 is able to distinguish the data. The second session identifier may be the same or different from the first data session identifier.

For example, in order to distinguish data sent by one network element 103 from data sent by another network element 103, a unique port number is sent along with the data. The port number is used as the second session identifier or part of second the session identifier. The unique port number may be first provided by remote assistance server 703 in communication step 812 along with the request. The unique port number is the same port number associated with the first data session in communication step 811. Therefore the first data session may be associated with a plurality of port numbers when access information from a plurality of network elements 103.

In one variant, before the request is sent in communication step 811, web server 702 may modify the contents of the request that is originally received in communication step 810. Alternatively, the modification may be performed by remote assistance server 703 before communication step 812.

In one variant, before the data is sent in communication step 815, web server 702 may modify the contents of the data that is originally received in communication step 814. Alternatively, the modification may be performed by remote assistance server 703 before communication step 814.

In one variant, in order to distinguish data sent by one network element 103 from data sent by another network element 103, a unique session identifier is sent along with the data. The unique session identifier may be first provided by remote assistance server 703 in communication step 812 along with the request.

When remote assistance server 703 receives the data, it forwards the data to web server 702 in communication step 814.

BRIEF DESCRIPTION OF DRAWINGS

FIG. 1 shows an exemplary network configuration according to various embodiments of the present invention.

FIG. 2 is an illustrative block diagram of a management server according to one of the embodiments of the present invention.

FIG. 3 is a flowchart illustrating a process according to one of the embodiments of the present invention.

FIG. 4A is a sequence diagram illustrating how a management server forwards data between a network element and a terminal according to one of the embodiments of the present invention.

FIG. 4B is a sequence diagram illustrating communication steps according to one of the embodiments of the present invention.

FIG. 4C is a sequence diagram illustrating communication step according to one of the embodiments of the present invention.

FIG. 5 shows a webpage provided by a management server to a terminal according to one of the embodiments of the present invention.

FIG. 6 is a sequence diagram illustrating one of the embodiments according to the present invention.

FIG. 7 illustrates a network configuration according to various embodiments of the present invention.

FIG. 8 is a sequence diagram illustrating one of the embodiments according to the present invention.

The invention claimed is:

1. A method for allowing communication between a first network element and a terminal at a management server, wherein the management server is connected to a plurality of network elements through a plurality of connections, comprising:
   (a) maintaining a database used for recording a list of connections that have been established; updating the database by sending probing packets to determine status of the connections;
   (b) receiving a request from the terminal to communicate with the first network element during a first data session; wherein the terminal uses a first session identifier and the first network element uses a second session identifier, wherein the first and second session identifiers allow the terminal and the first network element to be recognized by the management server during the first data session; wherein the first and second session identifiers are provided by the management server;
- (c) determining whether a first connection has been established with the first network element;
- (d) establishing the first connection with the first network element if the first connection has not been established with the first network element; wherein when the management server is unable to communicate with the first network element, the first connection is initiated by the network element; and
- (e) periodically checking status of the first connection during the first data session;
- (f) maintaining the first connection if the first data session is not terminated;
- (g) forwarding data between the first network element and the terminal using the first connection during the first data session; wherein the forwarding is performed by:
  - (i) receiving original first Internet Protocol (IP) packets from the first network element through the first connection;
  - (ii) encapsulating the original first IP packets in other second IP packets;
  - (iii) sending the other second IP packets to the terminal;
  - (iv) the terminal decapsulating the original first IP packets from the other second IP packets;
  - (v) the terminal encapsulating original third IP packets in other fourth IP packets and sending the other fourth IP packets to the management server;
  - (vi) decapsulating the original third IP packets;
  - (vii) encapsulating the original third IP packets in other fifth IP packets; and
  - (viii) sending the other fifth IP packets to the first network element.

2. The method according to claim 1, wherein the first connection is established using one of, Secure Shell (SSH) or Control and Provisioning of Wireless Access Points (CAPWAP).

3. The method according to claim 1, wherein the first connection is associated with a port.

4. The method according to claim 1, wherein the second session identifier is an IP address of the first network element.

5. The method according to claim 1, wherein establishing the first connection comprises:
  instructing the first network element to establish the first connection through a second connection.

6. The method according to claim 1, wherein the first data session is established after the terminal has authenticated with the management server.

7. The method according to claim 1, wherein the management server is comprised of a remote assistance server and a web server.

8. The method according to claim 7, wherein the remote assistance server is connected to the first network element through the first connection and the web server is connected with the terminal through the first data session.

9. The method according to claim 1, wherein the first network element has a plurality of wide area network (WAN) interfaces and the first connection is established via a first WAN interface of the plurality of WAN interfaces.

10. The method according to claim 9, wherein the first connection is re-established via a second WAN interface of the plurality of WAN interfaces when the first connection is terminated.

11. The method according to claim 1, further comprising determining whether to modify some of the data based on at least in part the contents of the data and modifying the data if determined to do so before forwarding data is performed.

12. The method according to claim 11, wherein the data is a web page.

13. The method according to claim 11, wherein the data is one of, Hypertext Transfer Protocol (HTTP) header or Hypertext Transfer Protocol Secure (HTTPS) header.

14. A management server for allowing communication between a first network element and a terminal upon receiving a request from the terminal, wherein the management server is connected to a plurality of network elements through a plurality of connections, comprising:
  at least one network interface;
  at least one processing unit;
  at least one main memory;
  at least one secondary storage storing program instructions executable by the at least one processing unit for:
  - (a) maintaining a database configured for recording a list of connections that have been established; wherein the database is updated by sending probing packets to determine status of the connections;
  - (b) determining whether a first connection has been established with the first network element; wherein the first connection is a virtual private network (VPN) connection;
  - (c) establishing the first connection with the first network element if the first connection has not been established with the first network element; wherein when management server is unable to communicate with the first network element, the first connection is initiated by the network element; and
  - (d) periodically checking status of the first connection during the first data session;
  - (e) maintaining the first connection if the first data session is not terminated;
  - (f) forwarding data between the first network element and the terminal using the first connection during the first data session; wherein the forwarding is performed by:
    - (i) receiving original first Internet Protocol (IP) packets from the first network element through the first connection;
    - (ii) encapsulating the original first IP packets in other second IP packets;
    - (iii) sending the other second IP packets to the terminal;
    - (iv) the terminal decapsulating the original first IP packets from the other second IP packets;
    - (v) the terminal encapsulating original third IP packets in other fourth IP packets and sending the other fourth IP packets to the management server;
    - (vi) decapsulating the original third IP packets;
    - (vii) encapsulating the original third IP packets in other fifth IP packets;
    - (viii) sending the other fifth IP packets to the first network element;
  wherein the request is received during a first data session;
  wherein the terminal uses a first session identifier and the first network element uses a second session identifier;
  wherein the first and second session identifiers allow the terminal and the first network element to be recognized by the management server during the first data session; and
  wherein the first and second session identifiers are provided by the management server.

15. The management server of claim 14, wherein the first connection is established using one of, Secure Shell (SSH) or Control and Provisioning of Wireless Access Points (CAPWAP).

16. The management server of claim 14, wherein the first connection is associated with a port.

17. The management server of claim 14, wherein the second session identifier is an IP address of the first network element.

18. The management server of claim 14, wherein establishing the first connection comprises
instructing the first network element to establish the first connection through a second connection.

19. The management server of claim 14, wherein the first data session is established after the terminal has authenticated with the management server.

20. The management server of claim 14, wherein the management server is comprised of a remote assistance server and a web server.

21. The management server of claim 20, wherein the remote assistance server is connected to the first network element through the first connection and the web server is connected with the terminal through the first data session.

22. The management server of claim 14, wherein the first network element has a plurality of wide area network (WAN) interfaces and the first connection is established via a first WAN interface of the plurality of WAN interfaces.

23. The management server of claim 22, wherein the first connection is re-established via a second WAN interface of the plurality of WAN interfaces when the first connection is terminated.

24. The management server of claim 14, wherein the at least one secondary storage further stores program instructions executable by the at least one processing unit for: determining whether to modify some of the data based on at least in part the contents of the data and modifying the data if determined to do so before forwarding data is performed.

25. The management server of claim 24, wherein the data is a web page.

26. The management server of claim 24, wherein the data is one of, Hypertext Transfer Protocol (HTTP) header or Hypertext Transfer Protocol Secure (HTTPS) header.

27. A system comprising:
at least one terminal;
at least one network element;
at least one interconnected network; and
at least one management server for forwarding data between a first network element and a terminal; wherein the management server hosts at least one remote assistance server and at least one web server by virtualization;
wherein the terminal comprises at least one network interface, at least one processing unit, at least one main memory, at least one secondary storage, at least one output device, at least one input device, and at least one system bus;
wherein the network element comprises at least one network interface, at least one processing unit, at least one main memory, at least one secondary storage, and at least one system bus; and
wherein the management server comprises at least one network interface, at least one processing unit, at least one main memory, and at least one secondary storage storing program instructions executable by the at least one processing unit for:
(a) maintaining a database, wherein the database is used for recording a list of connections that have been established; wherein the database is updated by sending probing packets to determine status of the connections;
(b) receiving a request from the terminal to communicate with the first network element during a first data session; wherein the terminal uses a first session identifier and the first network element uses a second session identifier, wherein the first and second session identifiers allow the terminal and the first network element to be recognized by the management server during the first data session; wherein the first and second session identifiers are provided by the management server;
(c) determining whether a first connection has been established with the first network element; wherein the first connection is a virtual private network (VPN) connection;
(d) establishing the first connection with the first network element if the first connection has not been established with the first network element; wherein when the management server is unable to communicate with the first network element, the first connection is initiated by the network element; and
(e) periodically checking status of the first connection during the first data session;
(f) maintaining the first connection if the first data session is not terminated; and
(g) forwarding data between the first network element and the terminal using the first connection during the first data session.

28. The system of claim 27, wherein the at least one secondary storage of the management server further stores program instructions executable by the at least one processing unit for: determining whether to modify some of the data based on at least in part the contents of the data and modifying the data if determined to do so before forwarding data is performed.

29. The system of claim 28, wherein the data is a web page.

30. The system of claim 28, wherein the data is one of, Hypertext Transfer Protocol (HTTP) header or Hypertext Transfer Protocol Secure (HTTPS) header.

* * * * *